(12) United States Patent
Tanaka (10) Patent No.: US 7,393,306 B2
(45) Date of Patent: Jul. 1, 2008

(54) DRIVE POWER TRANSMISSION DEVICE

(75) Inventor: Tomohiko Tanaka, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 318 days.

(21) Appl. No.: 11/378,542

(22) Filed: Mar. 18, 2006

(65) Prior Publication Data

US 2006/0217230 A1    Sep. 28, 2006

(30) Foreign Application Priority Data

Mar. 22, 2005    (JP)    ............... 2005-082228

(51) Int. Cl.
*B60W 10/10* (2006.01)
(52) U.S. Cl. .................. 477/115; 701/61
(58) Field of Classification Search .......... 477/110, 477/115; 701/51, 61
See application file for complete search history.

(56) References Cited

U.S. PATENT DOCUMENTS

| | | | | |
|---|---|---|---|---|
| 4,754,665 A | * | 7/1988 | Vandervoort | 74/745 |
| 4,920,815 A | * | 5/1990 | Reynolds | 74/335 |
| 5,224,392 A | * | 7/1993 | Hutchison et al. | 74/335 |
| 6,205,389 B1 | * | 3/2001 | Genise | 701/51 |
| 6,527,662 B2 | * | 3/2003 | Miyata et al. | 475/216 |
| 6,979,275 B2 | | 12/2005 | Hiraku et al. | |

FOREIGN PATENT DOCUMENTS

| | | |
|---|---|---|
| JP | 2003-035353 | 2/2003 |
| JP | 2003-269600 | 9/2003 |

* cited by examiner

*Primary Examiner*—Ha D. Ho
(74) *Attorney, Agent, or Firm*—Young Basile (57) ABSTRACT

During switching of an input rotation transmission mechanism, the actual engine rotational speed at the start of the switching and the speed changing ratio change amount owing to the switching operation are used as a basis for computing the target engine rotational speed of an engine and for computing the target speed changing ratio for an automatic transmission such that the rotational speed of automatic transmission on the side toward input rotation transmission mechanism nearly matches the rotational speed of input rotation transmission mechanism on the side toward automatic transmission, and shifting operation control for automatic transmission is executed in the opposite direction that is synchronized with the switching operation of input rotation transmission mechanism.

9 Claims, 6 Drawing Sheets

DRIVE POWER TRANSMISSION DEVICE

TECHNICAL FIELD

The present invention relates to a drive power transmission device that accelerates or decelerates the drive power produced by an engine as necessary and transmits it to wheels.

BACKGROUND OF THE INVENTION

Usually a torque converter or other fluid transmission mechanism is arranged between an automatic transmission and an engine to boost the torque. Because the torque converter performs power transmission via a fluid, however, the transmission efficiency is poor, and this is undesirable.

In Japanese Kokai Patent Application No. 2003-035353, which is assigned to the assignee of the present invention, a type of input rotation transmission mechanism with a torque boosting function and having a high transmission efficiency is proposed. That input rotation transmission mechanism is composed of an epicyclic gear mechanism instead of a fluid transmission mechanism. It has a low-speed stage that reduces the input engine speed and a high-speed stage that transmits the input engine rotation as is. Because up-shifting and down-shifting are performed in the low-speed stage and high-speed stage, respectively, this input rotation transmission mechanism is also called a secondary transmission. As a substitute for the torque converter, it is inserted in the drive train between the engine and the automatic transmission, also known as the principal transmission. When the vehicle starts to move, the input rotation transmission mechanism is in the low-speed stage selection state, and from the neutral state in which the driving frictional elements of the back/forth switching mechanism of the automatic transmission are released, driving is effected by control to engage the driving frictional element.

In Japanese Kokai Patent Application No. 2003-269600, which is also assigned to the assignee of the present invention, there is taught a method of control for preventing gear-shifting shock by means of gear-shifting (shifting operation) with synchronization between the input rotation transmission mechanism and the automatic transmission.

BRIEF SUMMARY OF THE INVENTION

Accordingly, one aspect of the invention provides a drive power transmission device coupled to an engine. The device comprises an input rotation transmission mechanism having a low-speed stage that reduces an engine rotational speed from a direction of the engine and a high-speed stage on an up-shift side with respect to the low-speed stage. The input rotation transmission mechanism is operable to select either the low-speed stage or the high-speed stage through a switching operation. This aspect of the invention also comprises an automatic transmission in series with the input rotation transmission mechanism, where the automatic transmission is operable to perform gear-shifting operations for rotation coming from the direction of the engine. Target engine rotational speed computing means is for computing a target engine rotational speed of the engine for an operation of shifting the automatic transmission in a direction opposite to a switching direction of the switching operation based on the amount of change in the speed-changing ratio realized by the switching operation and an engine rotational speed at a start of the switching operation when the input rotation transmission mechanism executes the switching operation between the low-speed stage and the high-speed stage, and target speed-changing ratio computing means for computing a target speed-changing ratio for the automatic transmission so that its rotational speed on a side toward the input rotation transmission mechanism is nearly equal to a rotational speed of the input rotation transmission mechanism on the side toward the automatic transmission at an end of the switching operation. In this aspect of the invention, the automatic transmission is operable to shift to the target speed-changing ratio in synchronization with the switching operation of the input rotation transmission mechanism.

Another aspect of the invention is a drive power transmission device including an engine that generates drive power to wheels. The device comprises a main transmission operable to change a rotational speed of an output shaft of the engine and to transmit the drive power to the wheels and a secondary transmission between the engine and the main transmission operable to change the rotational speed of the output shaft and to transmit the drive power to the main transmission. The device also comprises transmission control means for controlling respecting transmission gear ratios of the main transmission and the secondary transmission. The transmission control means is operable to control the main transmission to change its transmission gear ratio toward deceleration while the transmission gear ratio of the secondary transmission changes toward acceleration and/or toward acceleration while the transmission gear ratio of the secondary transmission changes toward deceleration. The transmission control means is also operable to complete changing the transmission gear ratio of the secondary transmission after the main transmission reaches a target transmission gear ratio.

The control method for a drive power transmission device according to another aspect of the invention comprises determining whether a transmission gear ratio of a secondary transmission furnished between an engine and a main transmission is to be changed, calculating a target transmission gear ratio of the main transmission, initiating a change of the transmission gear ratio of the secondary transmission, initiating a change of the transmission gear ratio of the main transmission after initiating the change of the transmission gear ratio of the secondary transmission, completing the change of the transmission gear ratio of the main transmission, and completing the change of the transmission gear ratio of the secondary transmission after completing the change of the transmission gear ratio of the main transmission.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

The present invention provides a type of synchronized gear-shifting controller for an input rotation transmission mechanism of a vehicle. Preferably, the target engine rotational speed is set such that the synchronized gear-changing operation of the input rotation transmission mechanism and the automatic transmission can be performed quickly and free of gear-shifting shock. In addition, acceleration or deceleration of the vehicle can be performed preferentially, and, based the automatic transmission serving as the principal transmission, the vehicle is subjected to synchronized shifting operation on the target engine rotational speed.

To satisfy these needs, a power drive transmission device is provided. In one embodiment, this device is incorporated in the driving system of a vehicle where the driving system includes an input rotation transmission mechanism having a low-speed stage that reduces the input rotation speed from the engine side and a high-speed stage on the up-shift side with respect to the low-speed stage. This input rotation transmission mechanism selects either the low-speed stage or the high-speed stage. Coupled in series with the input rotation transmission mechanism is an automatic transmission that performs gear-shifting operations for the rotation coming from the engine side.

The power drive transmission device in this embodiment includes target engine rotational speed computing means that computes the target engine rotational speed of the engine for the operation of shifting the automatic transmission in the direction opposite to the switching direction of the switching operation based on the amount of change in the speed-changing ratio realized by the switching operation and the engine rotational speed at the start of the switching operation when the input rotation transmission mechanism executes a switching operation between the low-speed stage and the high-speed stage. The power drive transmission device according to this embodiment also includes target speed-changing ratio computing means that computes the target speed-changing ratio for the automatic transmission so that its rotational speed on the side toward the input rotation transmission mechanism is nearly equal to the rotational speed of the input rotation transmission mechanism on the side toward the automatic transmission side when the switching operation of the input rotation transmission mechanism ends. The automatic transmission is preferably shifted to the target speed-changing ratio in synchronization with the switching operation of the input rotation transmission mechanism.

For the synchronized gear-shifting controller described, while the engine rotational speed is being increased to the target engine rotational speed, a down-shifting operation is performed for the automatic transmission to the speed-changing ratio corresponding to the target engine rotational speed. Consequently, there is no need to perform the shifting operation for the automatic transmission over a large speed-changing ratio range, and the synchronized gear-shifting can be completed quickly compared with the conventional gear-shifting control method. At the same time, acceleration/deceleration of the vehicle can be better achieved, and the running performance of the vehicle can be improved.

Figure 1:
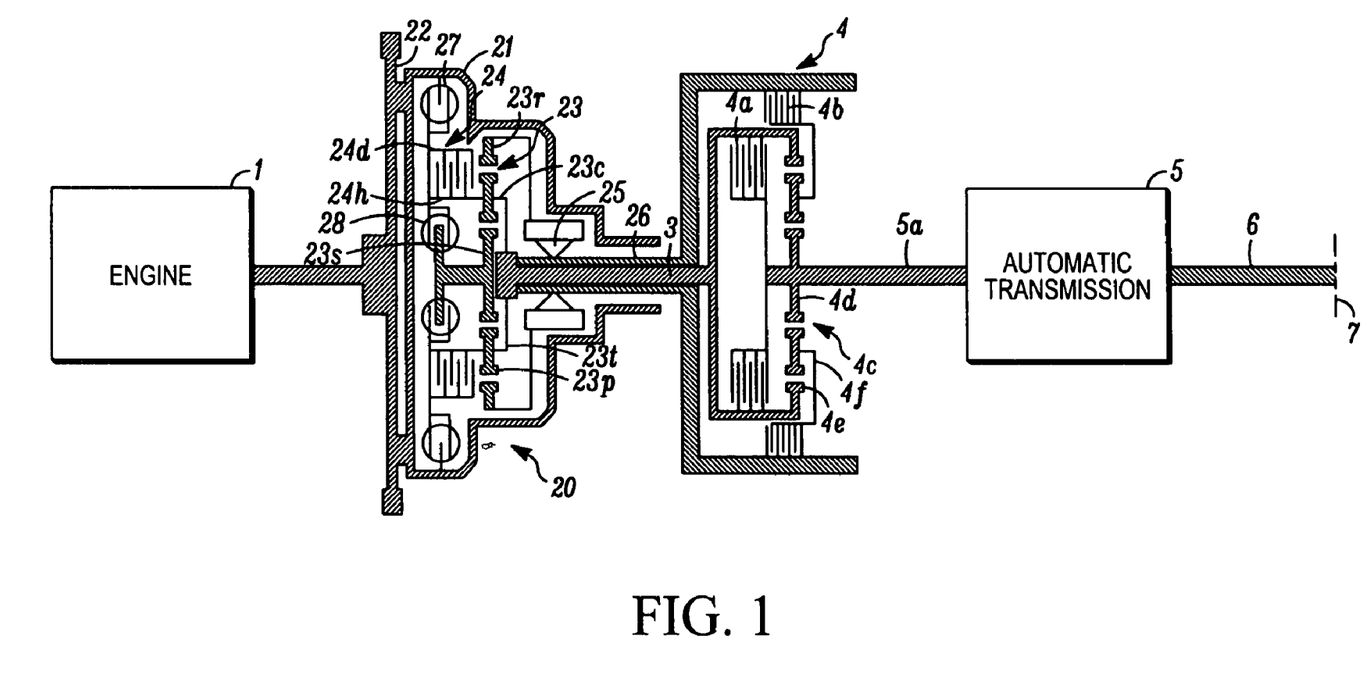
FIG. 1 is a partial cross-sectional system diagram illustrating the driving system of a vehicle having the synchronized gear-shifting controller for an automatic transmission in one embodiment.

This and other embodiments can be explained in detail based on the figures. FIG. 1 illustrates the driving system of the vehicle having a synchronized gear-shifting controller. First, the transmission path of the present device will be briefly described. Rotation of a prime mover, engine 1, is transmitted sequentially to wheels (represented by line 7) via an input rotation transmission mechanism 20, an input shaft 3, a back-and-forth switching mechanism 4, an automatic transmission 5, and an output shaft 6. Each of these elements is discussed in more detail hereinafter.

The back-and-forth switching mechanism 4 operates as follows. When the vehicle moves forward in the D (drive) gear position a forward clutch 4a is engaged, and the engine rotation from input rotation transmission mechanism 20 is transmitted as is. When the vehicle moves backward in the R (reverse) gear position a reversing brake 4b is engaged, and the engine rotation from input rotation transmission mechanism 20, discussed in more detail hereinafter, is speed-reduced and transmitted while in reverse rotation. Finally, when the vehicle is parked or stopped in either the P (park) or N (neutral) gear position forward clutch 4a and reversing brake 4b are both released, and the engine rotation from input rotation transmission mechanism 20 is not transmitted to the rear stage.

The automatic transmission 5 is a known transmission, such as the toroidal stepless transmission or V-belt stepless transmission described in U.S. Pat. No. 6,979,275, which is assigned to the assignee of the present invention and whose contents are incorporated herein in their entirety by reference. The automatic transmission 5 allows continuous changing of (i.e., shifting operation of) the selected speed-changing ratio based on the throttle opening manipulated by the driver and on the vehicle speed.

The input rotation transmission mechanism 20 is a substitute for a conventional torque converter. It has a low-speed stage and high-speed stage, and it performs the switching (or shifting) operation described in more detail below.

Herein, automatic transmission 5 is also called the principal transmission, and input rotation transmission mechanism 20 is also called the secondary transmission. Also, in order to avoid confusion, the shifting operation of the secondary transmission, input rotation transmission mechanism 20, is called a switching operation to be distinguishable from the shifting operation of the principal transmission, automatic transmission 5.

Figure 2:
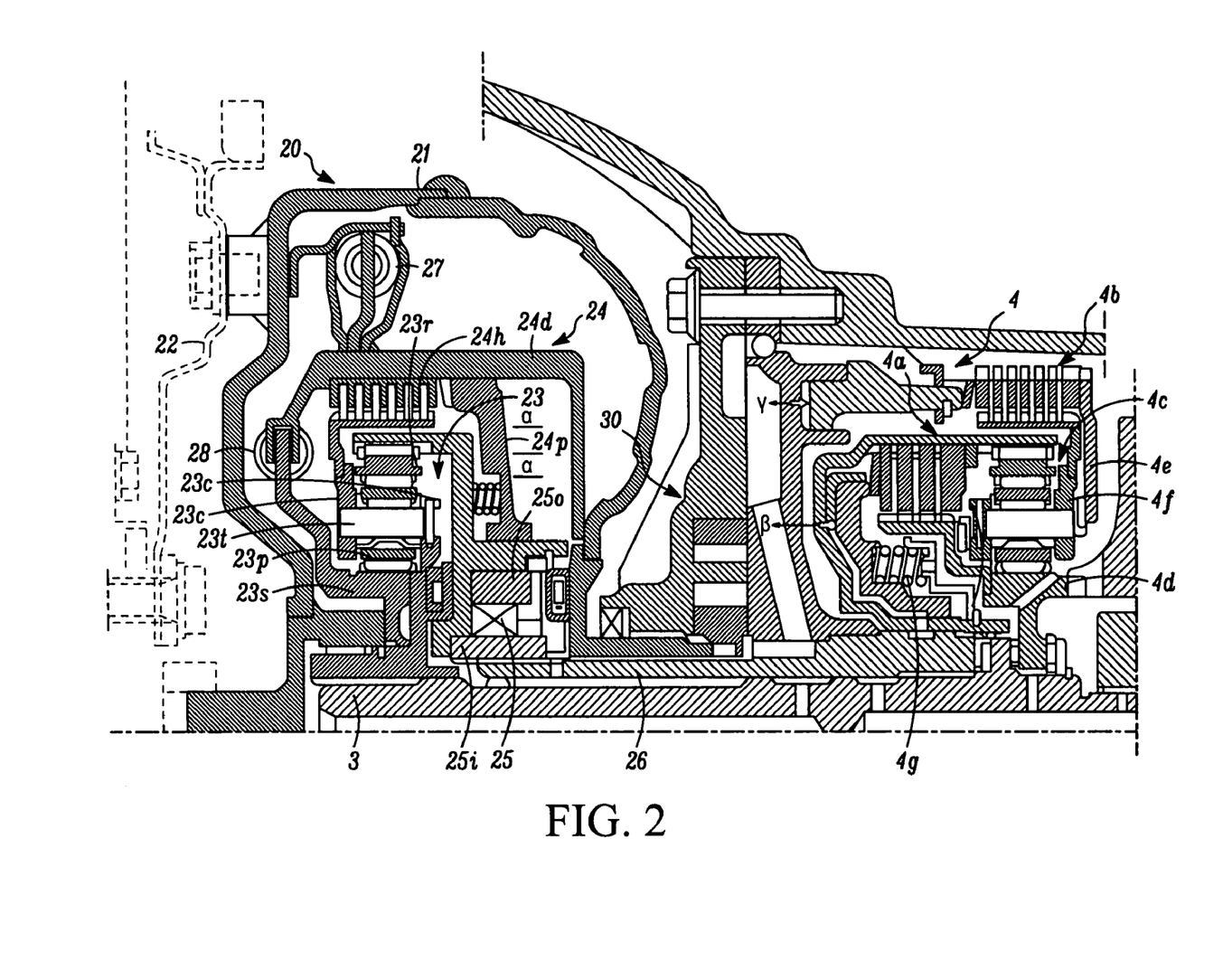
FIG. 2 is a longitudinal half cross section illustrating one assembly of the input rotation transmission mechanism, together with the back-and-forth switching mechanism, in the driving system according to the embodiment of FIG. 1.

FIG. 2 is a longitudinal cross section in a plane containing the rotating shaft illustrating in more detail the input rotation transmission mechanism 20. Housing 21 is coupled to the crank shaft (output shaft) of engine 1 via drive plate 22, and the members described below are assembled inside the housing 21 to form secondary transmission 20. Oil pump 30 that generates oil pressure a and oil pressure β rotates by the drive power of engine 1 being transmitted through housing 21. Oil is discharged by this rotation, and oil pressure α and oil pressure β are generated.

Input shaft 3 from back-and-forth switching mechanism 4 is inserted in housing 21, and a simple epicyclic gear unit 23 is installed on the insertion end portion of input shaft 3. Usually, the epicyclic gear unit 23 is composed of the following parts: a sun gear 23s, a ring gear 23r, plural pinions 23p engaged with the two gears 23r, 23s and a carrier 23c that supports the pinions 23p via a pinion shaft 23t.

The carrier 23c of the epicyclic gear unit 23 is drivably coupled to input shaft 3. At the same time it is also drivably coupled to a clutch hub 24h of a high-speed stage selecting clutch 24. The ring gear 23r of epicyclic gear unit 23 is carried on hollow fixed shaft 26 via one-way clutch 25. Consequently, the ring gear 23r cannot rotate in the direction opposite to the rotation of engine 1. As shown in FIG. 2, inner race 25i of one-way clutch 25 is fixed on hollow fixed shaft 26, and at the same time outer race 25o of one-way clutch 25 is connected to ring gear 23r. In this manner one-way clutch 25 is included between hollow fixed shaft 26 and ring gear 23r.

In addition to the clutch hub 24h referenced previously, the high-speed stage selecting clutch 24 also has a clutch drum 24d accommodated in the housing 21 in a freely rotatable way. This clutch drum 24d is drivably coupled to the housing 21 via a high-speed stage damper 27 and is drivably coupled to the sun gear 23s of the epicyclic gear unit 23 via a low-speed stage damper 28.

The high-speed stage selecting clutch 24 also has clutch piston 24p sized to be slidable in the axial direction in clutch drum 24d. When the clutch piston 24p is driven to the left of FIG. 2 under pressure α, high-speed stage selecting clutch 24 couples clutch drum 24d and clutch hub 24h. While in this high-speed selection state, the rotation of high-speed stage damper 27 passes through the carrier 23c and is directly transmitted (through direct coupling) to input shaft 3 without passing through low-speed stage damper 28. This corresponds to the lockup state in a conventional torque converter.

In contrast, when the pressure a on clutch piston 24p is turned OFF, and the high-speed stage selecting clutch 24 is released, the rotation of high-speed stage damper 27 passes through low-speed stage damper 28 to sun gear 23s of the epicyclic gear unit 23. Because high-speed stage selecting clutch 24 is released, and one-way clutch 25 stops rotation of ring gear 23r in the direction opposite to engine 1, sun gear 23s drives carrier 23c in the same direction with reduced speed so that power is transmitted to input shaft 3 in the low-speed stage selection state. This corresponds to the converter state in the conventional torque converter.

Damper characteristics of high-speed stage damper 27 are set as those required in the high-speed stage selection state (also called the direct connection stage selection state). Similarly, the characteristics of low-speed stage damper 28 are set as those required in the low-speed stage selection state.

The back-and-forth switching mechanism 4 is next described. As shown in FIGS. 1 and 2, in addition to forward clutch 4a and reversing brake 4b mentioned previously, the back-and-forth switching mechanism 4 also has a simple epicyclic gear unit 4c. When forward clutch 4a is engaged under pressure β, sun gear 4d and ring gear 4e of the epicyclic gear unit 4c are engaged with each other, and epicyclic gear unit 4c is placed in an interlocked state in which all of the rotating members are driven to rotate as an integral unit. As a result, rotation from input shaft 3 is directly transmitted to automatic transmission 5 as the latter stage (see FIG. 1), so that the vehicle can move forward in the D (drive) gear position. On the other hand, when reversing brake 4b is engaged under pressure y as shown in FIG. 2 carrier 4f of the epicyclic gear unit 4c is fixed, and the rotation from input shaft 3 is reduced in speed. As a result, rotation is transmitted, with reverse rotation, from sun gear 4d to automatic transmission 5 as the latter stage, so that the vehicle can move backward in the R (reverse) gear position.

When the vehicle is parked or stopped at either the P (park) or N (neutral) gear position, both the forward clutch 4a and the reversing brake 4b are released (i.e., are in neutral state). Since the rotation from input shaft 3 is not transmitted to automatic transmission 5 as the latter stage, the vehicle can be parked or stopped.

When the vehicle proceeds into motion, secondary transmission 20 is set in the low-speed stage (reduced speed stage) selected state since high-speed stage selecting clutch 24 is released. From the neutral state in which both forward clutch 4a and reversing brake 4b of the back-and-forth switching mechanism 4 are released, the vehicle is started into motion by controlling forward clutch 4a, which is the forward movement initiating frictional element in the D (drive) gear position, to engage, or by controlling reversing brake 4b, which is the backward movement initiating frictional element in the R (reverse) gear position.

In the D (drive) gear position, the pre-stored gear-shifting map for the principal transmission 5 is used as a reference, and automatic transmission 5 is under shift control such that the speed-changing ratio becomes the target speed-changing ratio determined from the vehicle speed and the throttle opening. Also, with the pre-stored gear-shifting map for the secondary transmission 20 being used as a reference, secondary transmission 20 is under switching control so that the low-speed stage or high-speed stage is selected based on the vehicle speed and the throttle opening. For example, when it is judged that the mode has changed from the low-speed stage selection region through the hysteresis region to the high-speed stage selection region, high-speed stage selecting clutch 24 is engaged, secondary transmission 20 enters the high-speed stage selection state, and it is possible to perform the prescribed switching control while forward clutch 4a is engaged. This switching control is carried out by means of a main routine control.

Figure 3:
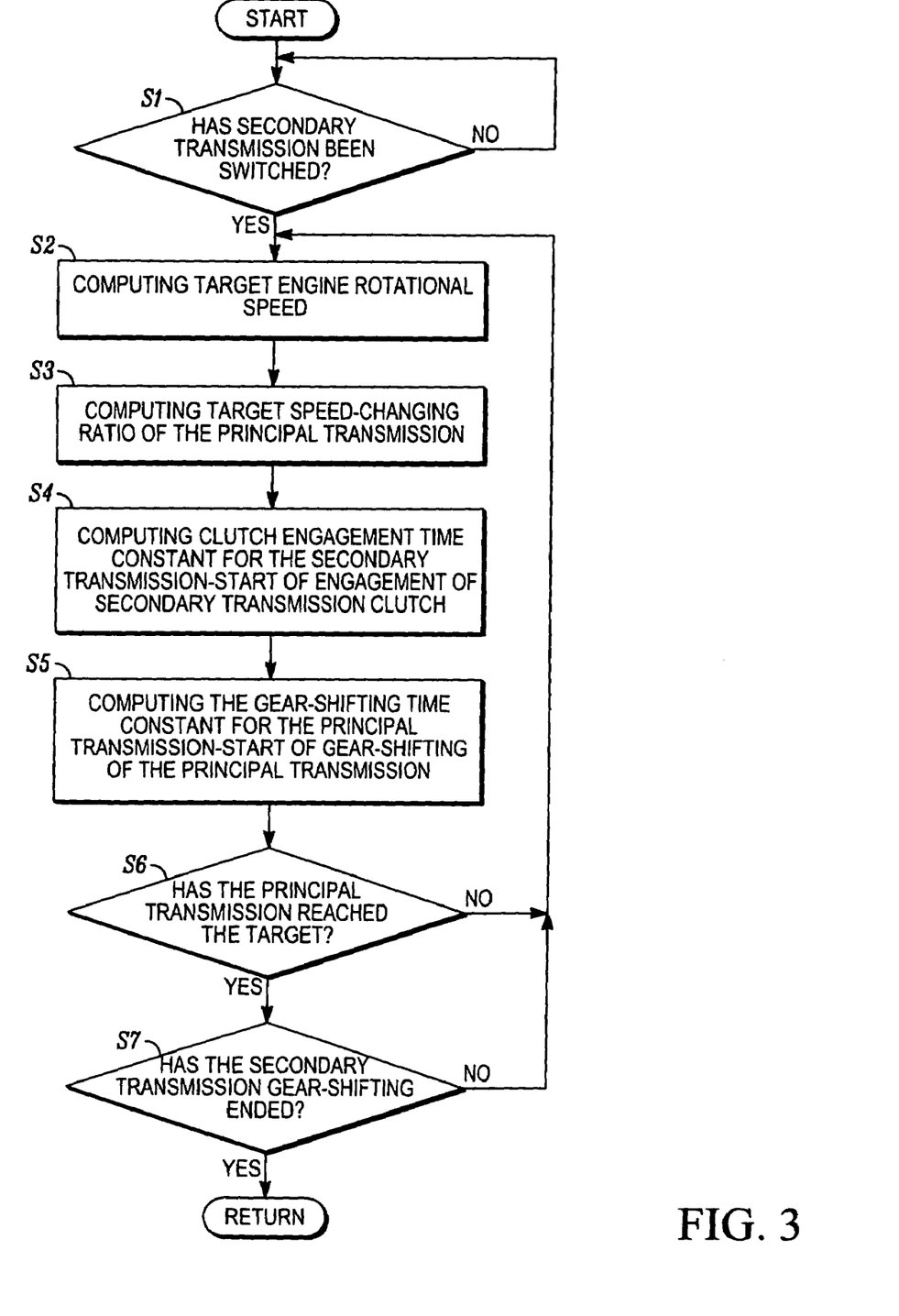
FIG. 3 is a flow chart illustrating the control processing sequence executed by the synchronized gear-shifting controller according to the embodiment of FIG. 1.

During switching control of secondary transmission 20, the synchronized gear-shifting control of automatic transmission 5 is carried out by means of a control subroutine. FIG. 3 is a flow chart illustrating the control processing sequence of the transmission mechanism 20 and automatic transmission 5. This processing sequence can be performed by a general purpose engine controller as is known in the art that includes memory, inputs and outputs and is programmable with a plurality of control routines. Alternatively, a special purpose (i.e., dedicated) controller can be used. Regardless of whether a general purpose controller or a dedicated controller performs this control subroutine for synchronized gear-shifting control, it is called herein a synchronized gear-shifting controller. In the following, the control processing sequence performed by the synchronized gear-shifting controller will be explained with reference to FIG. 3.

First, in step S1 a judgment is made from the vehicle speed and the throttle opening as to whether input rotation transmission mechanism 20 (i.e., the secondary transmission) has been switched. If the result is YES, that is, input rotation transmission mechanism 20 is switched for an up-shift from the low-speed stage to the high-speed stage, or for a downshift from the high-speed stage to the low-speed stage, processing proceeds to step S2. If the result is NO, that is, when no switching has been performed, processing returns to step S1, and the switching operation of input rotation transmission mechanism 20 is monitored further.

In step S2, the target engine rotational speed of engine 1 is computed based on the switching direction of input rotation transmission mechanism 20, the speed-changing ratio change amount due to the switching operation, the actual rotational speed of engine 1 at the start of the switching operation and the vehicle speed.

Because the direct connection stage is selected in the case of up-shifting input rotation transmission mechanism 20, the rotational speed of input shaft 3 becomes the target engine rotational speed directly, as is. Here, if the target engine rotational speed is computed by multiplying the speed-changing ratio change amount from the operation of switching input rotation transmission mechanism 20 with the actual engine rotational speed at the start of the switching operation, there is an excessive reduction of the actual engine rotational speed. Also, assuming the engine rotational speed at the start of the switching operation to be directly taken as the target engine rotational speed as is, there is almost no change in the engine rotational speed. However, as explained above, it is necessary to again perform up-shifting of automatic transmission 5.

Figure 4:
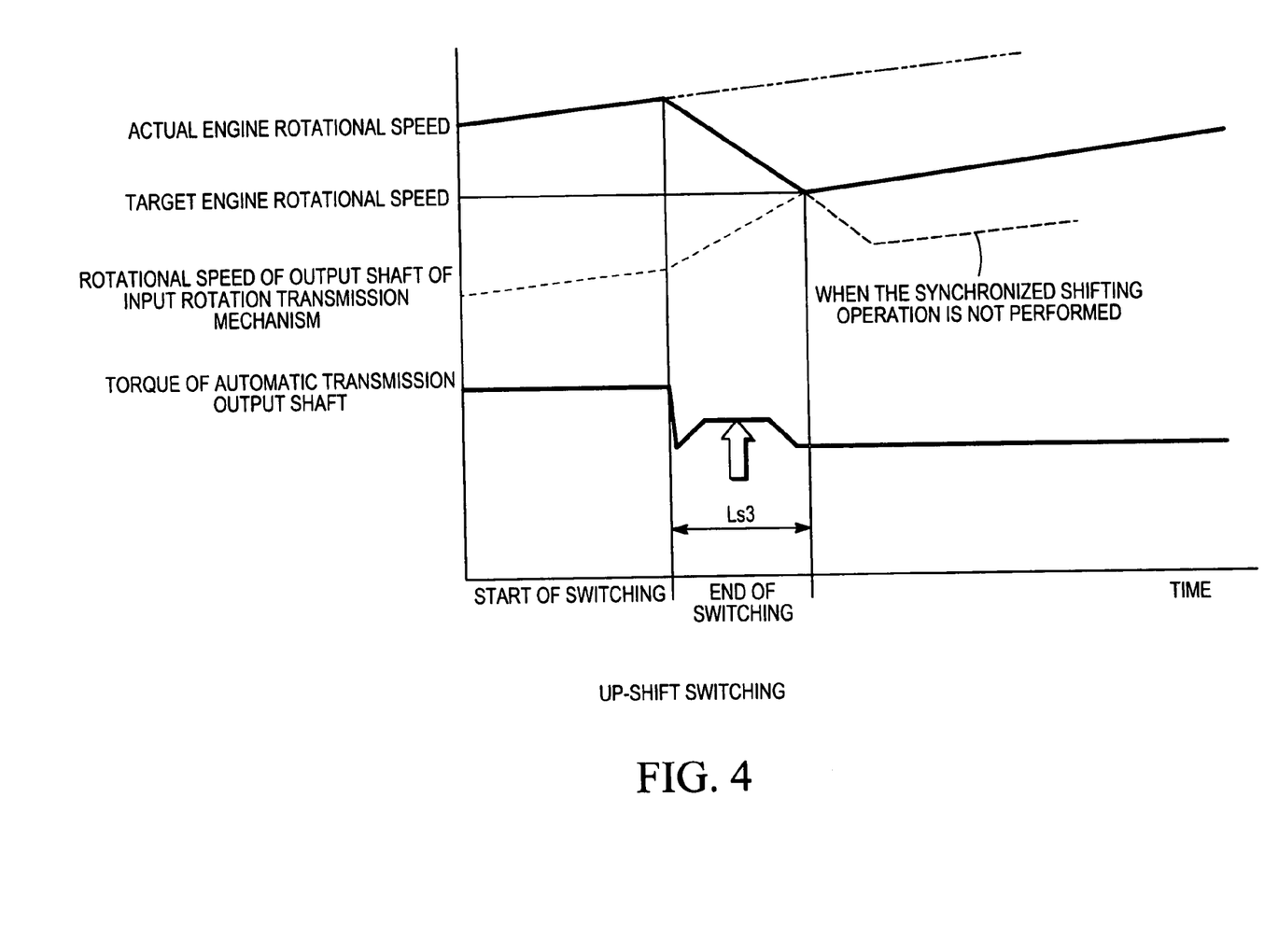
FIG. 4 is a time chart illustrating the rotational speed of the driving system in the up-shift mode of the input rotation transmission mechanism according to the embodiment of FIG. 1.
Figure 5:
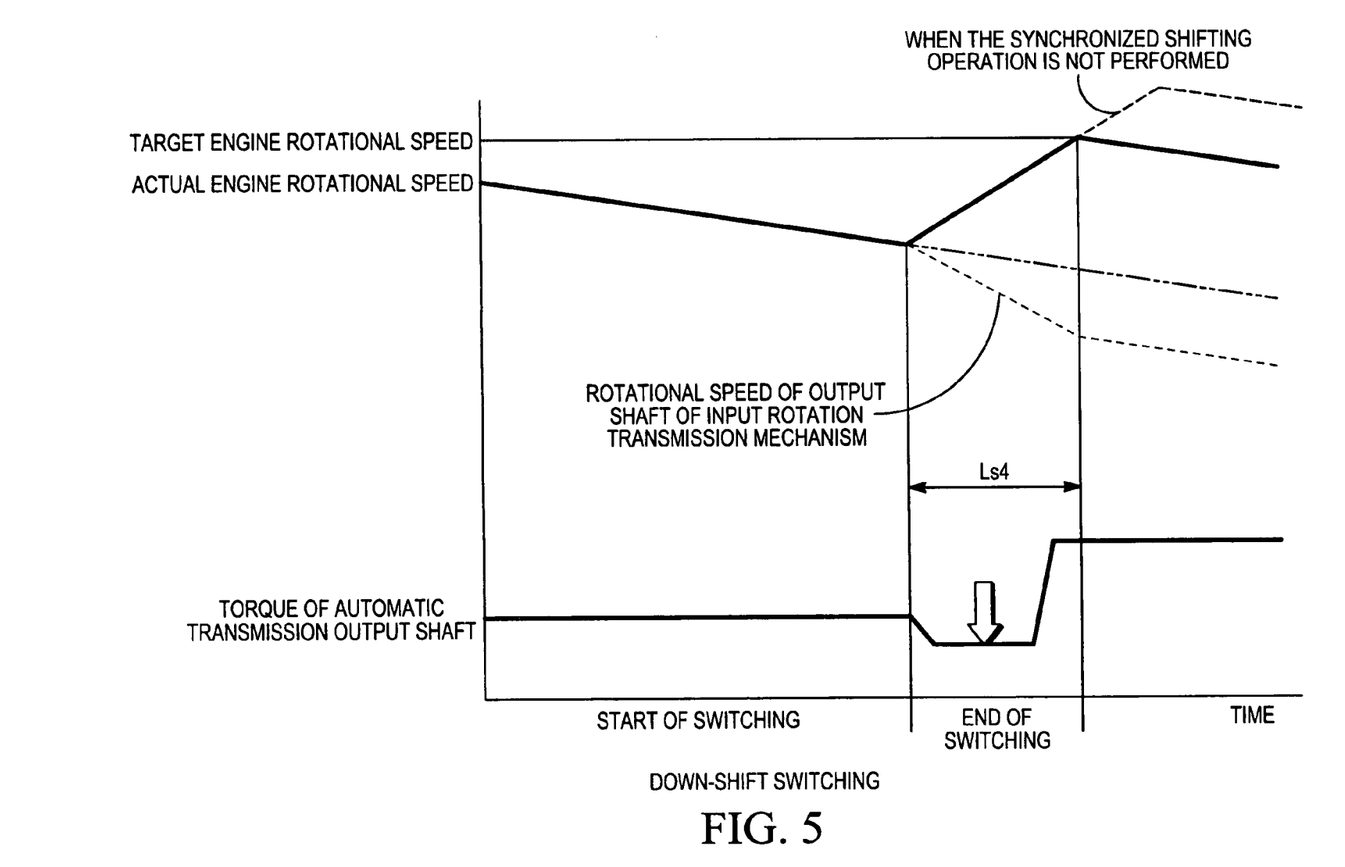
FIG. 5 is a time chart illustrating the rotational speed of the driving system in the down-shift mode of the input rotation transmission mechanism according to the embodiment of FIG. 1.

With regard to step S2, when the switching direction of input rotation transmission mechanism 20 during switching of input rotation transmission mechanism 20 is in the up-shift direction, automatic transmission 5 is synchronized to down-shift in the opposite direction. Consequently, the target engine rotational speed is set higher than the engine rotational speed would be at the end of the switching operation without performing any synchronized down-shift operation. That is, the target engine rotational speed is higher than the rotational speed (the wide broken line in FIG. 4) obtained by multiplying the speed-changing ratio change amount due to the up-shift switching operation with the engine rotational speed (the dot-dash line in FIG. 4). The rotational speed indicated by the broken line in FIG. 4 is the same as an actual engine rotational speed without performing a synchronized shifting operation. On the other hand, when the switching direction of input rotation transmission mechanism 20 is in the down-shift direction, automatic transmission 5 is synchronized to up-shift in the opposite direction. Consequently, the target engine rotational speed is set lower than the engine rotational speed would be at the end of the switching operation without performing any synchronized up-shift operation. That is, the target engine rotational speed is lower than the rotational speed (wide broken line in FIG. 5) obtained by multiplying the speed-changing ratio change amount due to the down-shift switching operation with the engine rotational speed (the dot-dash line in FIG. 4). As shown in FIG. 5, the rotational speed indicated by the wide broken line is the same as an actual engine rotational speed without performing a synchronized shifting operation.

In particular, with regard to step S2 of the present example, during up-shift switching of input rotation transmission mechanism 20, as shown in FIG. 4, the target engine rotational speed is set at the middle engine rotational speed between the actual engine rotational speed at the start of the switching operation, indicated by the solid line, and the output shaft rotational speed of input rotation transmission mechanism 20 at the start of the switching operation, indicated by the fine broken line. Here, the output shaft rotational speed of input rotation transmission mechanism 20 refers to the rotational speed on the side toward automatic transmission 5 of input rotation transmission mechanism 20 as shown in FIG. 1, that is, the rotational speed of input shaft 3. The middle engine rotational speed refers to any value intermediate between the two engine rotational speeds. Consequently, the target engine rotational speed may be set at the average value of the actual engine rotational speed at the start of the switching operation and the output shaft rotational speed of secondary transmission 20. By taking the average value, it is possible to perform the operation of shifting automatic transmission 5 with a small ratio width. A smaller reduction in the actual engine rotational speed is allowed, and it is possible to shorten time Ls3 needed for synchronized gear-shifting shown in FIG. 4 to about half the time needed for synchronized gear-shifting in the prior art with a nearly constant engine rotational speed.

Also, as shown in FIG. 5, during down-shift switching the actual engine rotational speed at the start of the switching operation indicated by the solid line is set at the middle engine rotational speed between the target engine rotational speed and the rotational speed of the output shaft of input rotation transmission mechanism 20, indicated by the broken line at the end of the switching operation. Here, the rotational speed of the output shaft of input rotation transmission mechanism 20 refers to the rotational speed on the side toward automatic transmission 5 of input rotation transmission mechanism 20 as shown in FIG. 1, that is, the rotational speed of input shaft 3. The middle, or intermediate, engine rotational speed refers to any value between the two engine rotational speeds. Consequently, the target engine rotational speed may be set such that the actual engine rotational speed at the start of said switching operation becomes the average value of the target engine rotational speed and the rotational speed of the output shaft of input rotation transmission mechanism 20. By taking the average value, the shifting operation of automatic transmission 5 can be realized with a smaller ratio width, the amount of increase in the actual engine rotational speed can be reduced, and it is possible to shorten time Ls4 needed for synchronized gear-shifting shown in FIG. 5 to about half the time needed for synchronized gear-shifting in the prior art with a nearly constant engine rotational speed.

Also, as shown in FIGS. 4 and 5, when the rotational speed of the output shaft of input rotation transmission mechanism 20 indicating the rotational speed of input shaft 3 and the actual engine rotational speed vary over time, the process returns from step S6, to be explained later, to the current step S2, re-computation is carried out, and if there is acceleration/deceleration, the acceleration/deceleration is reflected in the target engine rotational speed.

In one aspect of the invention, the following scheme can also be adopted. First, the relationship between the output torque and the output rotational speed for each value of the throttle opening of engine 1 is pre-stored as an engine performance characteristics map such as that shown in FIG. 6. With reference to the amount that the accelerator pedal is pressed down by the driver (throttle opening) and the performance characteristics map, the rotational speed is set corresponding to the maximum output torque. For example, when the throttle opening is in the range of 50-100%, reference to the engine performance characteristics map shown in FIG. 6 indicates that the engine rotational speed corresponding to the maximum output torque lies in the range of 4000-5200 rpm. The target engine rotational speed is then computed from the rotational speed region of 4000-5200 rpm in relationship with the middle value. In addition, a scheme can also be adopted in which an engine rotational speed of about 4800 rpm corresponding to the maximum output torque is set as the target engine rotational speed irrespective of the middle value.

Figure 6:
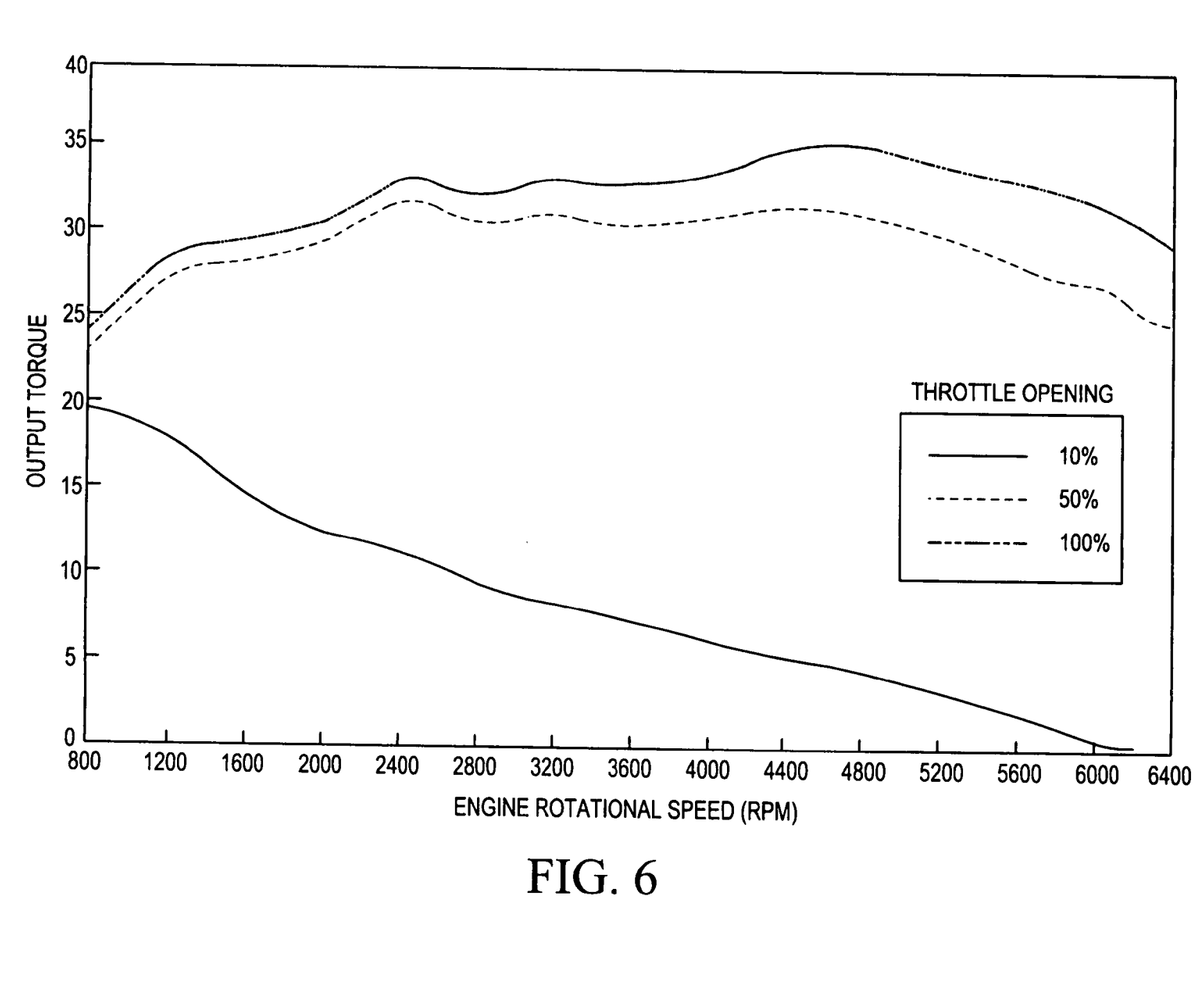
FIG. 6 is a diagram illustrating engine performance characteristics indicating the relationship between the engine rotational speed and the engine output torque at each throttle opening.

As a result, it is possible to improve the acceleration performance in up-shift switching and in down-shift switching, that is, in the kick-down mode. Also, in the down-shift switching operation, a scheme can be adopted in which the amount that the accelerator pedal is pressed down by the driver and the performance characteristics map are used as a reference, and the rotational speed corresponding to the minimum output torque is adopted. As a result, it is possible to improve the deceleration performance with engine braking applied.

Returning now to FIG. 3, step S3 follows step S2. In step S3, the target speed-changing ratio is computed for automatic transmission 5. In this computation, a condition is that the rotational speed of automatic transmission 5 on the side toward input rotation transmission mechanism 20, that is, the rotational speed of input shaft 3, nearly matches the rotational speed of input rotation transmission mechanism 20 on the side toward automatic transmission 5. The target speed-changing ratio of automatic transmission 5 needed to meet this condition is computed. Here, the so-called target speed-changing ratio refers to the target speed-changing ratio in the down-shifting operation of automatic transmission 5 when up-shift switching of input rotation transmission mechanism 20 is performed, and it is the target speed-changing ratio in the up-shifting operation of automatic transmission 5 when down-shift switching of secondary transmission 20 is performed. More specifically, the value has as a denominator for the rotational speed calculated by dividing the rotational speed of input shaft 3 at the start of switching by the selected speed-changing ratio of automatic transmission 5 at the start of switching and has as a numerator for the rotational speed calculated by dividing the target engine rotational speed computed in step S2 by the selected speed-changing ratio of input rotation transmission mechanism 20 at the end of switching. As shown in FIG. 4, when the rotational speed of the output shaft of input rotation transmission mechanism 20, which represents the rotational speed of input shaft 3, and the actual engine rotational speed are increased by acceleration re-computation is performed. Also, as shown in FIG. 5, re-computation is also performed even when the actual engine rotational speed is reduced in deceleration.

After step S3, the process proceeds to step S4, where the engagement time constant for high-speed stage selecting clutch 24 of the secondary transmission 20 is computed. The engagement time constant refers to the constant used in performing clutch engagement progress control for realizing time Ls3 or Ls4 required from the start to the end of switching. Based on the computed engagement time constant, high-speed stage selecting clutch 24 is engaged, and switching of input rotation transmission mechanism 20 is started. The time from the start (at step S4) of the switching operation of secondary transmission 20 to the end (at step S7), to be explained later, can be adjusted according to the engagement progress control of high-speed stage selecting clutch 24.

In place of this example, the target rotational speed of input shaft 5a of automatic transmission 5 can also be preset based on the relationship between the rotational speed of oil pump 30 and the amount of oil discharged or the oil pressure. That is, when automatic transmission 5 changes the transmission gear ratio according to the change in transmission gear ratio of secondary transmission 20, the rotational speed of input shaft 5a accelerates. If up-shifting is ended when the rotational speed of input shaft 5a and the rotational speed of engine 1 agree, the shock when secondary transmission 5 up-shifts can be reduced. But, when the rotational speed of input shaft 5a is too low, the amount of oil discharged from the oil pump or the oil pressure may be insufficient. For this reason, if the target rotational speed of input shaft 5a of automatic transmission 5 is preset based on the relationship between the rotational speed of oil pump 30 and the amount of oil discharged or the oil pressure, the amount of oil or the oil pressure supplied from oil pump 30 can be ensured, and an insufficient amount of oil discharge or oil pressure due to a drop in the rotational speed of engine 1 can be prevented.

In step S5, which follows step S4, the speed-changing time constant for automatic transmission 5 is computed (also called the gear-shifting time constant). The speed-changing time constant refers to the constant used in speed-changing control for realizing the shifting operation in synchronization from the start to the end of switching of the secondary transmission 20. Then, based on the computed speed-changing time constant, the shifting operation of automatic transmission 5 is started.

After step S5 a judgment is made in step S6 as to whether the speed-changing ratio of automatic transmission 5 has become the target speed-changing ratio computed in step S3, that is, whether the shifting operation of automatic transmission 5 has come to an end. If the shifting operation has not come to an end (NO), processing returns to step S2, and the operation of shifting the principal transmission 5 is continued. In this case, the target engine rotational speed and the target speed-changing ratio are re-computed in steps S2 and S3. When the rotational speed of the output shaft of input rotation transmission mechanism 20 and the actual engine rotational speed vary due to acceleration/deceleration after the start of switching, it is possible to update the target engine rotational speed and the target speed-changing ratio by means of this re-computation.

When the judgment made in step S6 is that the operation of shifting automatic transmission 5 has come to an end (YES), processing proceeds to step S7. In step S7, a judgment is made as to whether the operation of switching secondary transmission 20 has come to an end. If the switching operation has not come to an end (NO), processing returns to step S2, and the control of synchronized gear-shifting is continued. On the other hand, if it is judged that the switching operation has come to an end (YES) in step S7, the synchronized gear-shifting control is turned OFF.

The start of the operation of shifting automatic transmission 5 (at step S5) and the end of the shifting operation (at step S6) are set between the start of the switching operation (at step S4) and the end of the switching operation (at step S7) of input rotation transmission mechanism 20. During the operation of switching input rotation transmission mechanism 20, automatic transmission 5 is subjected to synchronized gear-shifting control. The operation of shifting automatic transmission 5 in synchronization with the operation of switching input rotation transmission mechanism 20 refers to the operation of shifting automatic transmission 5 based on the speed-changing ratio change amount, etc., due to the switching operation during the operation of switching input rotation transmission mechanism 20.

According to this example, in step S2 during execution of an operation switching between the low-speed stage and the high-speed stage of input rotation transmission mechanism 20, in the case of either up-shift or down-shift directions of the switching operation, the target engine rotational speed for the operation of shifting the automatic transmission 5 in the direction opposite to the current switching direction is computed based on the speed-changing ratio change amount due to the switching operation and the engine rotational speed at the start of the switching operation. In step S3, at the end of the operation of switching input rotation transmission mechanism 20, the target speed-changing ratio for the automatic transmission 5 is computed wherein the rotational speed of input shaft 3 matches the rotational speed of input rotation transmission mechanism 20 on the side toward automatic transmission 5. Shifting of automatic transmission 5 to the target speed-changing ratio in step S5 is synchronized with the switching operation of input rotation transmission mechanism 20 in step S4.

As a result, it is possible to change the engine rotational speed with a small amount of change of the speed-changing ratio of automatic transmission 5, and there is no need to perform the operation of shifting automatic transmission 5 with a large ratio width. As shown in FIGS. 4 and 5, it is possible to ease the gear-shifting shock and to reduce the time needed for the synchronized speed-changing operation to Ls3, Ls4.

More specifically, when up-shifting of input rotation transmission mechanism 20 is performed, as shown in FIG. 4, approximately the middle value between the actual engine rotational speed at the start of switching and the rotational speed of input shaft 3 at the start of switching is set as the target engine rotational speed. Also, in the case of down-shifting, as shown in FIG. 5, the target engine rotational speed is set such that the actual engine rotational speed at the start of switching becomes nearly the middle value between the target engine rotational speed and the rotational speed of input shaft 3 at end of switching. The throttle opening of engine 1 is then adjusted so that at the end of switching the actual engine rotational speed and the target engine rotational speed are nearly the same. As a result, the synchronized gear-shifting controller of the present invention can preferably achieve easing of the gear-shifting shock and reduction of the time needed for the synchronized gear-shifting control.

The following scheme can also be adopted. In the case of an up-shift, the amount that the accelerator pedal is pressed down by the driver (throttle opening) is read, the engine rotational speed with the highest output torque is determined using as a reference the relationship between the engine rotational speed at that throttle opening and the engine output torque (engine performance curve), and that engine rotational speed is set as the target engine rotational speed. This makes it possible to improve the acceleration performance.

Another possible scheme involves the case of a down-shift. During the down-shift, the engine rotational speed corresponding to the lowest engine output torque is determined based on the engine performance curve, and this engine rotational speed is set at the target engine rotational speed. As a result, it is possible to improve the deceleration performance as engine braking is applied.

Also in the present example, process flow returns from said step S7 to step S2, the target engine rotational speed and the target speed-changing ratio are re-computed, and the values computed in the previous round are corrected to the re-computed values. Consequently, when the actual engine rotational speed and the rotational speed of input shaft 3 are increased from the start of the operation of switching input rotation transmission mechanism 20 to after the operation as shown in FIG. 4, that is, during the acceleration, it is possible to achieve the acceleration and to increase and correct the target engine rotational speed at the end of the switching operation corresponding to the acceleration, and it is possible to appropriately execute synchronized gear-shifting irrespective of the time Ls3 needed for synchronized gear-shifting and the magnitude of the acceleration. Also, even when the actual engine rotational speed and the rotational speed of input shaft 3 are decreased as shown in FIG. 5 due to brake application or climbing a slope, etc., it is possible from the start to the end of the switching operation of input rotation transmission mechanism 20 to reduce and correct the target engine rotational speed at the end of the switching operation corresponding to the deceleration, and it is possible to appropriately execute synchronized gear-shifting irrespective of the time Ls4 needed for synchronized gear-shifting and the magnitude of the deceleration. Consequently, in addition to preventing gear-shifting shocks it is also possible to realize a constant acceleration/deceleration through the switching operation and to improve the running performance of the vehicle.

Furthermore, the synchronized gear-shifting controller of the present example can also be adopted for a stepped transmission that selects a gear-shifting stage from among plural gear-shifting stages with fixed speed-changing ratios for automatic transmission 5. The stepped transmission can be a single stage transmission or a stepped transmission composed of a series combination of a 3-stage transmission and a 2-stage transmission, allowing 6-stage selection. In this case, in step S5 of the flow chart shown in FIG. 3 the gear-shifting stage with a speed-changing ratio nearest to the target speed-changing ratio is selected from among plural gear-shifting stages, and the shifting operation to the selected speed-changing stage can be performed.

What has been explained above is merely by example. According to the present invention, various modifications can be applied as long as the essence is preserved. For example, a scheme can also be adopted in which the output torque of engine 1 is first input to automatic transmission 5, and it is then input to input rotation transmission mechanism 20.

This application is based on Japanese Patent Application No. 2005-082228, filed Mar. 22, 2005, in the Japanese Patent Office, the entire contents of which are hereby incorporated by reference.

Also, the above-described embodiments have been described in order to allow easy understanding of the present invention, and do not limit the present invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. A control method for a drive power transmission device, comprising:
    determining whether a transmission gear ratio of a secondary transmission furnished between an engine and a main transmission is to be changed;
    calculating a target transmission gear ratio of the main transmission;
    initiating a change of the transmission gear ratio of the secondary transmission;
    initiating a change of the transmission gear ratio of the main transmission after initiating the change of the transmission gear ratio of the secondary transmission;
    completing the change of the transmission gear ratio of the main transmission; and
    completing the change of the transmission gear ratio of the secondary transmission after completing the change of the transmission gear ratio of the main transmission.

2. The control method according to claim 1, further comprising:
    determining whether a direction of a gear change by the secondary transmission is toward deceleration; and
    setting the transmission gear ratio of the main transmission as the target transmission gear ratio.

3. The control method according to claim 1 wherein determining whether the transmission gear ratio of the secondary transmission is to be changed further comprises determining whether the secondary transmission is switched for an up shift from a low speed stage to a high speed stage, or for a down shift from the high speed stage to the low speed stage.

4. The control method according to claim 1, further comprising:
    changing the transmission gear ratio of the main transmission toward deceleration while the transmission gear ratio of the secondary transmission changes toward acceleration.

5. The control method according to claim 1, further comprising:
    changing the transmission gear ratio of the main transmission toward acceleration while the transmission gear ratio of the secondary transmission changes toward deceleration.

6. The control method according to claim 1, further comprising:
decelerating a rotational speed of an output shaft of the engine; and
transmitting the decelerated rotational speed to the main transmission.

7. The control method according to claim 1, further comprising:
transmitting a rotational speed of an output shaft of the engine to the main transmission at constant speed.

8. The control method according to claim 1 wherein completing the change of the transmission gear ratio of the secondary transmission further comprises completing the change of the transmission gear ratio of the secondary transmission when a rotational speed of an input shaft of the main transmission and a rotational speed of an output shaft of the engine are about equal.

9. The control method according to claim 1, further comprising:
rotating a pump rotatable with the engine; and
controlling the transmission gear ratio of the main transmission to the target transmission gear ratio based on an amount of oil discharged by the pump when the transmission gear ratio of the main transmission changes and a rotational speed of an input shaft of the main transmission.

* * * * *